United States Patent Office 3,576,867
Patented Apr. 27, 1971

3,576,867
PROCESS FOR MANUFACTURING
2,6-DICHLOROBENZAMIDE
Cornelis Johannes Schoot, Emmasingel, Eindhoven,
Netherlands, assignor to U.S. Philips Corporation, New
York, N.Y.
No Drawing. Filed Apr. 30, 1968, Ser. No. 725,537
Claims priority, application Netherlands, May 4, 1967,
6706282
Int. Cl. C07c 103/02
U.S. Cl. 260—558                        6 Claims

ABSTRACT OF THE DISCLOSURE

Conversion of 1,2-epoxy - 2,6,6 - trichlorocyclohexane carbonamide to 2,6-dichlorobenzamide in the presence of iodine or a metal halide.

It is known that 2,6-dichlorobenzamide is an important intermediate product for manufacturing the herbicide 2,6-dichlorobenzonitrile.

According to a known method the benzamide may be manufactured by aromatizing in one step 2,2,6,6-tetrachloro-1-hydroxy-cyclohexane-carbonamide while heating and in the presence of iodine or a metal halide, for example $ZnCl_2$ or $FeCl_3$.

In the accomplishment of the invention it appeared that this reaction may advantageously be carried out so that 2,2,6,6-tetrachloro-1-hydroxy-cyclohexanecarbonamide is first converted with the aid of lye into 1,2-epoxy-2,6,6-trichloro-cyclohexane-carbonamide and, subsequently, this compound is converted with the aid of a metal halide or iodine and while supplying heat into 2,6-dichlorobenzamide.

True, this process requires one step more than the known direct aromatization of 2,2,6,6 - tetrachloro - 1-hydroxy-cyclohexane-carbonamide, but the process according to the invention affords the advantage that nevertheless higher yields of 2,6-dichlorobenzamide are obtainable.

According to the invention, for manufacturing 2,6-dichlorobenzonitrile it is therefore advantageous to proceed in such manner that first, by a treatment with alkali, 1 mol. of HCl is split off from 2,2,6,6-tetrachloro-1-hydroxy-cyclohexane-carbonamide while forming 1,2-epoxy-2,6,6-trichloro-cyclohexane-carbonamide, whereafter this compound is aromatized while supplying heat and in the presence of iodine or a metal halide into 2,6-dichloro-benzamide while splitting off 1 mol. of $H_2O$ and 1 mol. of HCl, whereafter eventually this acid amide is converted in the usual manner into 2,6-dichloro-benzonitrile by splitting off water.

The epoxidation of 2,2,6,6-tetrachloro-1-hydroxy-cyclohexane-carbonamide may be carried out with the usual alkalies, for example with sodium hydroxide or potassium hydroxide, in a medium of aqueous ethanol and while heating slightly. (Fray, "Tetrahedron," 1963, 19, pages 1195 to 1200.)

The conversion of 1,2-epoxy-2,6,6-trichlorocyclohexane-carbonamide must be effected in an anhydrous medium, that is to say the reaction medium and the initial material must contain not more than 2% by weight of water.

The conversion is preferably effected in the presence of a solvent for the epoxide. For this purpose solvents can be used which have a boiling point between 70° C. and 250° C. Of these solvents which fulfill the specified condition, satisfactory results have been obtained especially with aromatic solvents which may be chlorinated, if desired. As such very satisfactory results have been obtained with benzene, monochlorobenzene, 1,2,4-trichlorobenzene and nitrobenzene.

The reaction can be carried out at comparatively low temperatures, for example between 60° C. and 70° C., but better yields are obtained at higher temperatures. Optimum results are obtained at a temperature between 100° C. and 200° C.

The reaction component which is substantially responsible for the conversion, namely the iodines or a metal halide, is preferably used to an excess amount, preferably from 1.5 to 2.5 times the molar quantities. Metal halides bringing about the desired conversion are, for example, aluminum chloride, cadmium chloride, cuprichloride, manganese chloride, magnesium chloride, cobalt chloride, nickel chloride, stannichloride, mercurichloride, ferrichloride, zinc chloride and titanium chloride. However, optimum results have been obtained with ferrichloride, whilst also good results were obtained with iodine, zinc chloride, aluminum chloride and, to a somewhat lesser extent, with mercurichloride.

Contrary to what has been stated hereinbefore, the epoxide may alternatively be converted into the aromatized acid amide by converting 1,2-epoxy-2,6,6-trichlorocyclohexane-carbonamide with aluminum chloride and while heating under anhydrous conditions into 2,6,6-trichloro-1-hydroxy-cyclohex-2-ene-carbonamide and, subsequently, aromatizing this compound with a metal halide, such as ferrichloride or zinc chloride at elevated temperature and under anhydrous conditions into 2,6-dichlorobenzamide, which substance in turn may be converted in known manner into 2,6-dichloro-benzonitrile. The aromatizing reaction gives comparatively high yields under these conditions. The reaction could also yield the desired 2,6-dichlorobenzamide without adding metal halide, but with slight heating. However, the yield would in this case have been considerably lower.

2,6-dichlorobenzonitrile may be obtained from 2,6-dichlorobenzamide by methods known per se, for example, by reacting the benzamide with $POCl_3$ while heating.

The invention will now be explained in detail with reference to the examples following hereinafter.

EXAMPLES (I) According to the description of Fray in "Tetrahedron" 1963, 19, page 1199, 1 - hydroxy-2,2,6,6-tetrachloro-cyclohexane-carbonamide was converted with the aid of potassium hydroxide, ethanol and water into 1,2-epoxy-2,6,6-trichloro-cyclohexane-carbonamide.

24.5 g. of 1,2-epoxy-2,6,6-trichloro-cyclohexane-carbonamide, together with 13.3 g. of aluminum chloride and 100 ml. of monochlorobenzene, were introduced into a three-neck flask provided with a stirrer, a thermometer and a reflux cooler. The reaction mixture was stirred at room temperature for 3 hours whereby the aluminum chloride was dissolved and an oil separated. Subsequently another 13.3 g. of aluminum chloride were added and the heating process was continued between 110° C. and 120° C., while stirring, for 2 hours.

After the reaction mixture had cooled down, the monochlorobenzene was removed by means of steam distillation and the residual solid matter recrystallized from water.

The yield of 2,6-dichloro-benzamide was 12 g. (melting point 203° C.), that is 65% of the yield possible theoretically.

(II) In a repeat of the reaction as has been described in Example I, the reaction mixture, after cooling, was extracted with water in order to remove the aluminum chloride. The organic layer was subsequently dried. 20 ml. of $POCl_3$ were then added to the liquid, whereafter the mixture was heated between 100° C. and 105° C. for 1 hour. The excess $POCl_3$ was decomposed by adding water, whereafter 2,6-dichloro-benzonitrile was isolated by steam distillation. The yield after purification was 13.8 g. (80%), melting point 143° C.

(III) 24.5 g. of 1,2-epoxy-2,6,6-trichlorocyclohexane-carbonamide (0.1 mol.) were dissolved in 150 ml. of monochloro-benzene, whereafter 17 g. of anhydrous zinc chloride were added to the solution. The reaction mixture was subsequently heated between 120° C. and 125° C. for 2 hours. Hydrochloric acid gas escaped and a viscous oil was separated. After cooling, the solvent was decanted and 25 ml. of POCl₃ were added to the oily residue. This mixture was heated at 100° C. for 1 hour. After cooling, the excess POCl₃ was decomposed by adding ice water and the resulting 2,6-dichlorobenzonitrile separated by steam distillation. This was filtered off and dried. Yield 10.7 g. (0.065 mol.)=65%.

(IV) The reaction described in Example III was repeated with FeCl₃ instead of zinc chloride as the reaction component (2.4 g.). The reaction temperature was 110° C. The yield of 2,6-dichlorobenzonitrile was 16.4 g. (0.095 mol.), that is 95% of the yield possible theoretically (0.1 mol. of initial material).

(V) 24.5 g. of 1,2-epoxy-2,6,6-trichlorocyclohexane-carbonamide, 75 ml. of mono-chlorobenzene and 42 g. of dry FeCl₃ were introduced into a three-neck-flask provided with a stirrer, a thermometer and a reflux cooler. The temperature of the reaction mixture was slowly raised, while stirring until hydrochloric acid was produced. This was found to be the case at 82° C. 60% of the hydrochloric acid were isolated within 2 hours at a temperature between 75° C. and 80° C. Subsequently the temperature was raised to 90° C. to increase the rate of reaction, whereafter another 30% of HCl were produced within 6 hours. The resulting 2,6-dichlorobenzamide was then converted at 100° C. into the corresponding nitrile and isolated through steam distillation. Yield 12.29 g. that is 71% of the theoretic yield.

(VI) 24.5 g. of 1,2-epoxy-2,6,6-trichlorocyclohexane-carbonamide, 100 ml. of monochlorobenzene and 13.3 g. of aluminum chloride were introduced into a three-neck-flask provided with a stirrer, a thermometer and a reflux cooler. The reaction mixture was stirred at room temperature for 3 hours whereby the aluminum chloride was dissolved. Subsequently an equal amount of aluminum chloride was again added. This mixture was heated at a temperature between 55° C. and 60° C. for 2 hours. After cooling, the reaction mixture was subjected to steam distillation in order to remove the solvent. The solid residue was then recrystallized from water, resulting in a yield of 12.5 g. of 1-hydroxy-2,6,6-trichloro-cyclohex-2-ene-carbonamide (melting point 195° C.). This is 50% of the yield possible theoretically.

The compound thus obtained (12.5 g.) was introduced, together with 8 g. of ferrichloride and 50 ml. of monochlorobenzene, into a three-neck-flask provided with a stirrer, a thermometer and a reflux cooler. The mixture was heated between 90° C. and 100° C. for 2 hours. Hydrochloric acid gas escaped during the reaction. Then 10 ml. of POCl₃ were added to the reaction mixture, which was then heated between 100° C. and 105° C. for 1 hour while stirring. The excess POCl₃ was decomposed with water and the resulting 2,6-dichlorobenzonitrile separated by steam distillation. The yield of 2,6-dichloro-benzonitrile was 7.3 g., that is 90% calculated on 1-hydroxy-2,6,6-trichloro-cyclohex-2-ene-carbonamide and 42% if calculated on 1,2-epoxy-2,6,6-trichlorocyclohexane-carbonamide.

(VII) 0.1 mol. of 1,2-epoxy-2,6,6-trichlorocyclohexane-carbonamide was aromatized with the aid of various reaction components, each in an amount of 0.25 mol. and dissolved in 75 ml. of 1,2,4-trichlorobenzene, to form 2,6-dichlorobenzamide, which compound was not separated but directly converted into 2,6-dichlorobenzonitrile with the aid of phosphorous oxychloride. The reaction component (A), the reaction temperature (B) and the yield of 2,6-dichlorobenzonitrile in percentages (C) of the initial product 1,2-epoxy-2,6,6-trichloro-cyclohexane-carbonamide are specified in the table below.

| A | B | C |
|---|---|---|
|   | ° C. | Percent |
| CdCl₂ | 195–200 | 22 |
| CuCl₂ | 195–200 | 30 |
| MnCl₂ | 200–210 | 23 |
| MgCl₂ | 200–210 | 12.5 |
| CoCl₂ | 200–210 | 36 |
| NiCl₂ | 195–200 | 32 |
| SnCl₄ | 140–150 | 20 |
| HgCl₂ | 170–180 | 52 |
| I₂ | 175–185 | 76 |
| FeCl₃ | 125 | 95 |
| AlCl₃ | 125 | 80 |
| ZnCl₂ | 130 | 65 |
| Blank | 210 | 0 |

What is claimed is:
1. A process for manufacturing 2,6-dichlorobenzamide comprising heating 1,2-epoxy-2,6,6-trichlorocyclohexane carbonamide at a temperature of between 60° C. to 200° C., under anhydrous conditions wherein initially not more than 2% by weight of water is present, in an inert epoxide solvent in the presence of a catalyst selected from the group consisting of iodine, aluminum chloride, cadmium chloride, cupric chloride, manganese chloride, magnesium chloride, cobalt chloride, nickel chloride, stannic chloride, mercuric chloride, ferric chloride, zinc chloride and titanium chloride.

2. The process of claim 1 wherein the metal halide is selected from the group consisting of mercuric chloride, zinc chloride and aluminum chloride.

3. The process of claim 2 wherein the heating step is carried out in a solvent having a boiling point between 70° C. and 250° C.

4. The process of claim 3 wherein the heating step is carried out at a temperature between 100° C. and 200° C.

5. The process of claim 4 wherein the solvent is an aromatic solvent.

6. The process of claim 5, wherein the solvent is selected from the group consisting of benzene, monochlorobenzene and 1,2,4-trichlorobenzene.

References Cited

Fray, Tetrahedron, pp. 1195–1200 (1963).

HENRY R. JILES, Primary Examiner

H. I. MOATZ, Assistant Examiner

U.S. Cl. X.R.

260—348, 557, 465